United States Patent
Nozaki

(10) Patent No.: US 7,030,862 B2
(45) Date of Patent: Apr. 18, 2006

(54) IMAGE FORMING APPARATUS, CONTROL METHOD FOR THE SAME, CONTROL PROGRAM, AND STORAGE MEDIUM STORING THE CONTROL PROGRAM

(75) Inventor: Tetsuya Nozaki, Chiba (JP)

(73) Assignee: Canon Kabushiki Kaisha, (JP)

( * ) Notice: Subject to any disclaimer, the term of this patent is extended or adjusted under 35 U.S.C. 154(b) by 315 days.

(21) Appl. No.: 10/233,063

(22) Filed: Aug. 30, 2002

(65) Prior Publication Data
US 2003/0063269 A1 Apr. 3, 2003

(30) Foreign Application Priority Data
Aug. 30, 2001 (JP) ............... 2001-261719

(51) Int. Cl.
*G09G 5/00* (2006.01)
(52) U.S. Cl. .................. 345/173; 345/810; 345/102
(58) Field of Classification Search ............... 345/173, 345/1.1–1.3, 2.1, 2.2, 3.1, 102, 104
See application file for complete search history.

(56) References Cited

U.S. PATENT DOCUMENTS

| | | | | |
|---|---|---|---|---|
| 5,900,848 A * | 5/1999 | Haneda et al. | ............... | 345/1.1 |
| 6,573,884 B1 * | 6/2003 | Kinzie | ............... | 345/1.1 |
| 6,670,950 B1 * | 12/2003 | Chin et al. | ............... | 345/173 |
| 6,795,059 B1 * | 9/2004 | Endo | ............... | 345/173 |
| 2002/0145594 A1 * | 10/2002 | Derocher | ............... | 345/173 |
| 2002/0171685 A1 * | 11/2002 | Christianson et al. | ............... | 345/835 |
| 2002/0186208 A1 * | 12/2002 | Feldman et al. | ............... | 345/173 |
| 2002/0191029 A1 * | 12/2002 | Gillespie et al. | ............... | 345/810 |
| 2003/0120997 A1 * | 6/2003 | Saito | ............... | 714/813 |

* cited by examiner

*Primary Examiner*—Amare Mengistu
(74) *Attorney, Agent, or Firm*—Rossi, Kimms & McDowell, LLP

(57) ABSTRACT

There is provided an image forming apparatus, which is free from erroneous operations of a plurality of operation parts provided in the apparatus. A selector selects at least one operation part out of a plurality of operation parts, and a main CPU invalidates a predetermined operation by at least one operation part that is not selected by the selector, out of the plurality of operation parts.

4 Claims, 12 Drawing Sheets

IMAGE FORMING APPARATUS, CONTROL METHOD FOR THE SAME, CONTROL PROGRAM, AND STORAGE MEDIUM STORING THE CONTROL PROGRAM

BACKGROUND OF THE INVENTION

1. Field of the Invention

The present invention relates to a control technique for operation parts in an image forming apparatus.

2. Description of the Related Art

In a conventional image forming apparatus, the operation panel that users use to make settings on the apparatus and operate the apparatus is often disposed on an upper surface of the apparatus main body, so that when the image forming apparatus is large, the operation panel will be disposed at a high position, so that there are problems such as the usability of the operation panel depending on the height of the user and the operation panel being difficult to use for users in wheelchairs.

To make image forming apparatuses easier to use for a larger number of users, an image forming apparatus with a construction in which the operation panel can be rotated so that the horizontal/vertical orientation can be changed as desired, and an image forming apparatus with a construction in which two operation panels are disposed at different positions have been realized.

However, a complicated construction is required in order to rotate the operation panel. Further, since it is also necessary to consider the strength and durability, such constructions are costly.

When an image forming apparatus has two operation parts, each user can choose to operate the operation part that is easier for that user to use. However, there are the problems of the possibility of erroneous operations being made unintentionally, such as when the user mistakenly touches a key on the other operation part when operating the apparatus, and of wasteful consumption of power when two operation parts are on simultaneously.

SUMMARY OF THE INVENTION

The present invention was conceived in view of the above problems with the related art, and it is an object of the present invention to provide an image forming apparatus, which is free from erroneous operations of a plurality of operation parts provided in the apparatus, as well as a control method for the same, a control program for the same, and a storage medium storing the control program.

To attain the above object, in a first aspect of the present invention, there is provided an image forming apparatus comprising a plurality of operation parts, a selection device that selects at least one operation part out of the plurality of operation parts, and a controller that invalidates a predetermined operation by at least one operation part that is not selected by the selection device, out of the plurality of operation parts.

Typically, the plurality of operation parts comprise substantially identical components with one another.

In a preferred form of the first aspect, the plurality of operation parts each have an input device, and the controller invalidates operations by the input device of each of the at least one operation part that is not selected by the selection device, out of the plurality of operation parts.

In another preferred form of the first aspect, the plurality of operation parts each have an input device including electric luminescence parts, and the controller invalidates operations by the input device of each of the at least one operation part that is not selected by the selection device, out of the plurality of operation parts, and lights the electric luminescence parts of the input device of all of at least one operation part of the plurality of operation parts corresponding to at least one of the input devices that is operated.

In a further preferred form of the first aspect, the plurality of operation parts each have an input device, and a liquid crystal display part having a backlight, and the controller invalidates operations by the input device of each of the at least one operation part that is not selected by the selection device, out of the plurality of operation parts, and prohibits lighting of the backlight of each of the at least one operation part that is not selected by the selection device.

In a still further preferred form of the first aspect, the plurality of operation parts each have an input device including electric luminescence parts, and a liquid crystal display part having a backlight, and the controller invalidates operations by the input device of each of the at least one operation part that is not selected by the selection device, out of the plurality of operation parts, prohibits lighting of the backlight of each of the at least one operation part that is not selected by the selection device, lights the electric luminescence parts of the input device of all of at least one operation part of the plurality of operation parts corresponding to at least one of the input devices that is operated, and outputs same display data for the liquid crystal display part of each of the plurality of operation parts regardless of the selection by the selection device.

In another preferred form of the first aspect, the plurality of operation parts each have an input device including electric luminescence parts, and a liquid crystal touch panel having a backlight, and the controller invalidates operations by the input device and input from the liquid crystal touch panel of each of the at least one operation part that is not selected by the selection device, out of the plurality of operation parts, prohibits lighting of the backlight of each of the at least one operation part that is not selected by the selection device, lights the electric luminescence parts of the input device of all of at least one operation part of the plurality of operation parts corresponding to at least one of the input devices that is operated, and outputs same display data for the liquid crystal touch panel of each of the plurality of operation parts regardless of the selection by the selection device.

In still another preferred form of the first aspect, the plurality of operation parts each have an input device, and a cathode ray tube display device, and the controller invalidates operations by the input device of each of the at least one operation part that is not selected by the selection device, out of the plurality of operation parts, and prohibits supply of power to the cathode ray tube display device of each of the at least one operation part that is not selected by the selection device.

In a further preferred form of the first aspect, the plurality of operation parts each have an input device including electric luminescence parts, and a cathode ray tube display device, and the controller invalidates operations by the input device of each of the at least one operation part that is not selected by the selection device, out of the plurality of operation parts, prohibits supply of power to the cathode ray tube display device of each of the at least one operation part that is not selected by the selection device, and lights the electric luminescence parts of the input device of all of at least one operation part of the plurality of operation parts corresponding to at least one of the input devices that is operated.

It is preferable that the image forming apparatus according to the first aspect comprises a detachable operation part, and a non-detachable operation part, and wherein the selection device selects the non-detachable operation part when the detachable operation part has been detached.

It is also preferable that the plurality of operation parts each have a second controller dedicated for controlling the operation part.

On the other hand, the controller controls all of the plurality of operation parts.

The selection device may be implemented by hardware, or alternatively the selection by the selection device may be implemented by software.

To attain the above object, in a second aspect of the present invention, there is provided a method of controlling an image forming apparatus including a plurality of operation parts, comprising a selecting step of selecting at least one operation out of the plurality of operation parts, and a control step of invalidating a predetermined operation by at least one operation part that is not selected in the selecting device, out of the plurality of operation parts.

To attain the above object, in a third aspect of the present invention, there is provided a control program that is executed by an image forming apparatus having a plurality of operation parts, the program comprising a step of invalidating a predetermined operation by at least one operation part that is not selected out of the plurality of operation parts.

To attain the above object, in a fourth aspect of the present invention, there is provided a computer-readable recording medium storing a control program comprising a selecting step of selecting at least one operation out of the plurality of operation parts, and a control step of invalidating a predetermined operation by at least one operation part that is not selected in the selecting device, out of the plurality of operation parts.

According to the present invention, although the image forming apparatus is provided with a plurality of operation parts, there is no risk of erroneous operations of the operation parts.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the accompanying drawings showing preferred embodiments thereof.

First Embodiment

Figure 1:
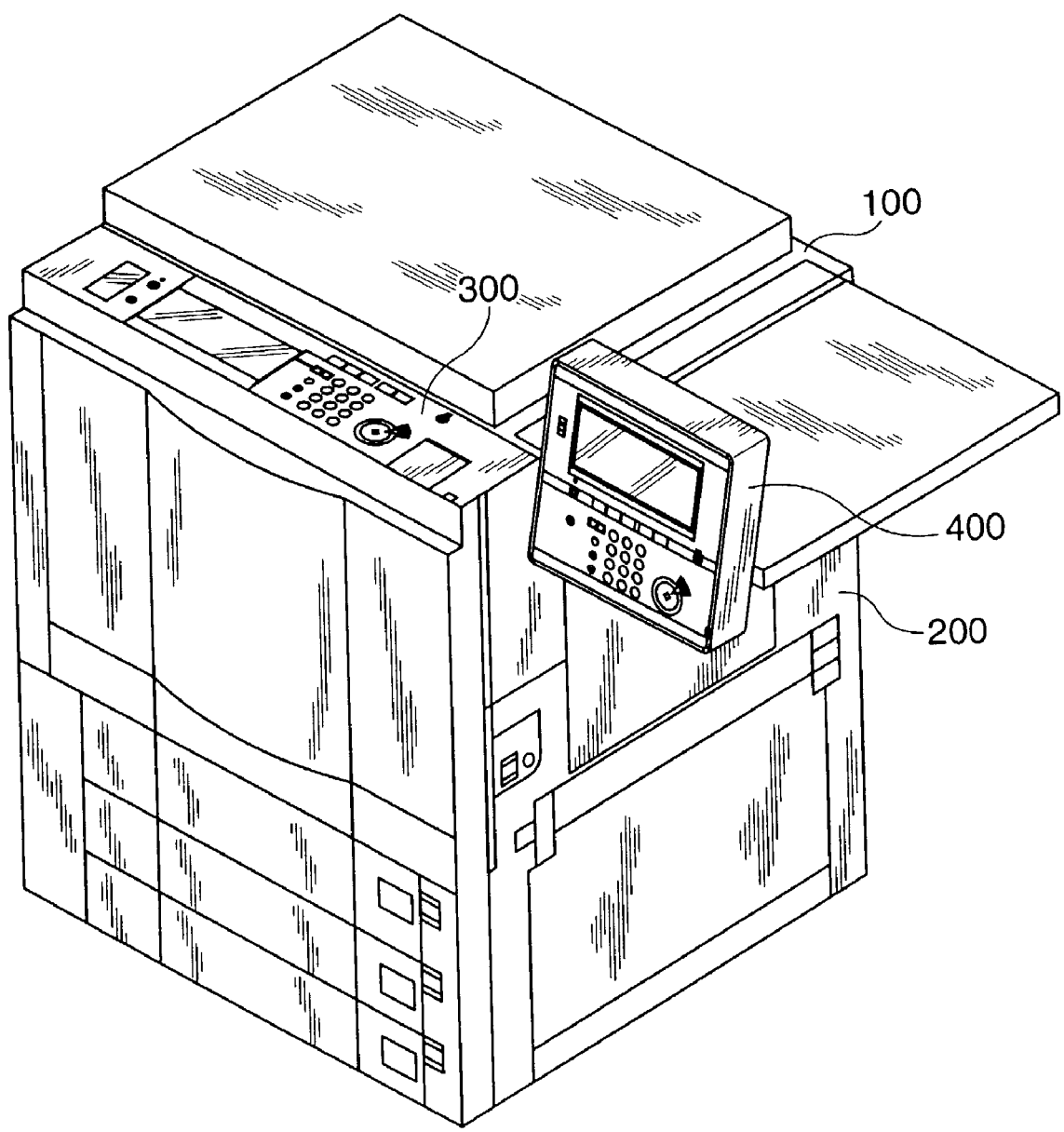
FIG. 1 is a perspective view showing an image forming apparatus according to a first embodiment of the present invention.

FIG. 1 is a perspective view of an image forming apparatus according to a first embodiment of the present invention.

In FIG. 1, reference numeral 100 is an image scanner part that reads an original image and performs digital signal processing on the read original image. Reference numeral 200 designates a printer part that prints and outputs the original image read by the image scanner part 100 onto a sheet in full color.

A first operation part 300, which is comprised of an operation panel, is disposed horizontally on an upper surface of the image forming apparatus, is used to perform settings of the print conditions, such as the number of copies, and to operate the apparatus, and also functions as a user interface that displays a variety of information about the apparatus on a LCD (Liquid Crystal Display) part 301 which will be described later with reference to FIG. 3.

A second operation part 400, which is comprised of an operation panel, is disposed substantially vertically on a side surface of the image forming apparatus, and has the same functions as the first operation part 300. The second operation part 400 is detachably connected to the printer part 200 by an interface cable, which can be detached from the outside.

The first operation part 300 and the second operation part 400 can be switched for operation by an operation part changeover switch 420, which will be described later with reference to FIG. 4, so that the user can select and use the operation panel that is easier for the user to use.

Figure 2:
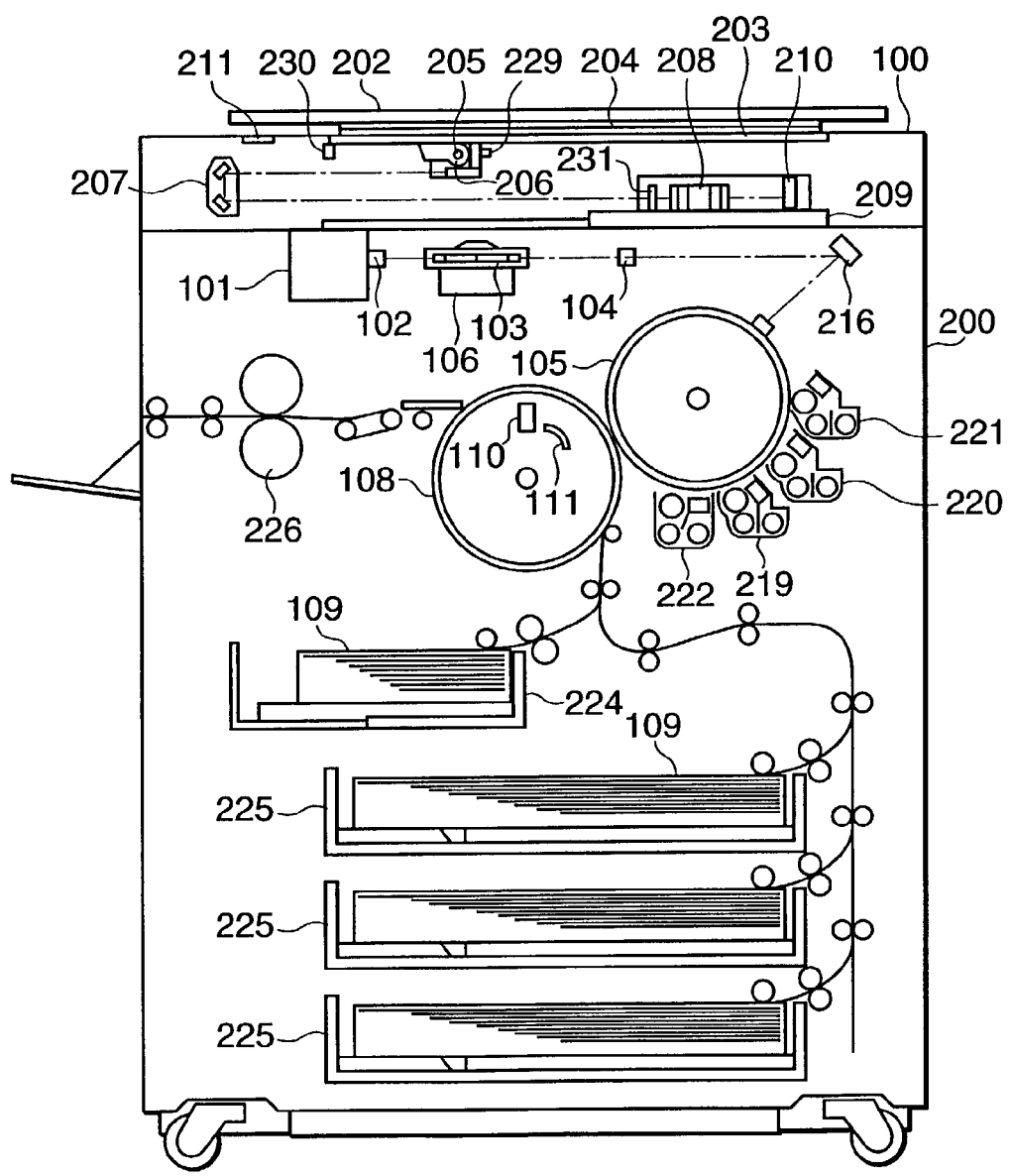
FIG. 2 is a cross-sectional view showing the schematic construction of the image forming apparatus appearing in FIG. 1.

FIG. 2 is a cross-sectional view showing the schematic construction of the image forming apparatus appearing in FIG. 1.

The image scanner part 100 and the printer part 200 read and output images based on information (indicative of a number of copies, color/black and white, image processing, etc.) that has been set by the user using the first operation part 300 or the second operation part 400.

In the image scanner part 100, an original 204 is pressed onto a platen glass (hereinafter simply referred to as "the platen") 203 by an original pressure plate 202 and the original 204 is illuminated with light from a halogen lamp 205. The light reflected off the original 204 is guided by mirrors 206, 207 and is focused by the lens 208 to form an optical image of the original 204 on an RGB 3 line sensor-type CCD (Charge Coupled Device) 210. An infrared blocking filter 231 is provided on the lens 208.

The CCD 210 separates the optical image formed from the original 204 into colors, reads the red (R), green (G), and blue (B) components, subjects these components to a photoelectric conversion, and outputs the resulting signals to an image signal processing part 209. In the CCD 210, the reading sensor arrays for the color components each have photoelectric converting elements sufficient for 5000 pixels. As a result, an A3-sized original, which is the largest original that can be placed on the platen 203, can be read with a resolution of 400 dpi (dots per inch) in the shorter side direction (297 mm).

It should be noted that the halogen lamp 205 and the mirror 206 are mechanically moved at a speed V and the mirror 207 is mechanically moved at a speed equal to ½ V in a perpendicular direction (hereafter the "subscanning direction") to an electrical scanning direction (the "main scanning direction"), so that the entire original is exposed and scanned.

Reference numeral 211 designates a standard white plate which is used to correct the data for each of the colors R, G, and B that have been read by the CCD 210. The standard white plate 211 has approximately even reflection characteristics for visible light, and appears white to the human eye.

In the image signal processing part 209, the RGB image data that has been read by the CCD 210 is separated into magenta (M), cyan (C), yellow (Y), and black (BK) color components that are transferred to the printer part 200. Also, each time an original is scanned by the image scanner part 100, the color components for one of the colors M, C, Y, and BK are sent to the printer part 200, so that a single printing operation is completed by scanning the original four times.

The image data composed of the M, C, Y, and BK components received from the image signal processing part 209 is sent to a laser driver 101 in the printer part 200. The laser driver 101 modulates and drives a semiconductor laser 102 based on this image data. A polygon mirror 103 that is rotatively driven by a polygon motor 106 causes laser light from the semiconductor laser 102 to scan a photosensitive drum 105 in a direction corresponding to the main scanning direction, with the laser light passing being guided via an f-θ lens 104 and a mirror 216 so as to be incident on the photosensitive drum 105 where an electrostatic latent image is formed.

A developer is comprised of a magenta developer 219, a cyan developer 220, a yellow developer 221, and a black developer 222, with these four developers alternately coming into contact with the photosensitive drum 105 so that C, M, Y and BK latent images formed on the photosensitive drum 105 are developed with the corresponding toners.

Reference numeral 108 designates a transfer drum, which is connected to the photosensitive drum 105 by a gear, not shown, for rotation together with the photosensitive drum 105. A sheet 109 that has been supplied from a sheet cassette 224 or 225 is wound around the transfer drum 108 and the developed toner images that are formed on the photosensitive drum 105 are transferred onto the sheet 109.

A TOP sensor 110 and a sensor shielding flag 111, which rotates together with the transfer drum 108, are disposed inside the transfer drum 108. A TOP signal that is generated when the sensor shielding flag 111 shields the TOP sensor 110 is a rotational position reference signal for the transfer drum 108. The printer part 200 requests the image scanner part 100 to output images in synchronization with this rotational position reference signal, so that toner images of each color are definitely formed on the transfer drum 108 at a predetermined position, thereby making it possible to align the image formation position of each color.

After toner images of the four colors M, C, Y, and BK have been successively transferred in this way, the sheet 109 passes a fixing unit 226 and is discharged.

Figure 3:
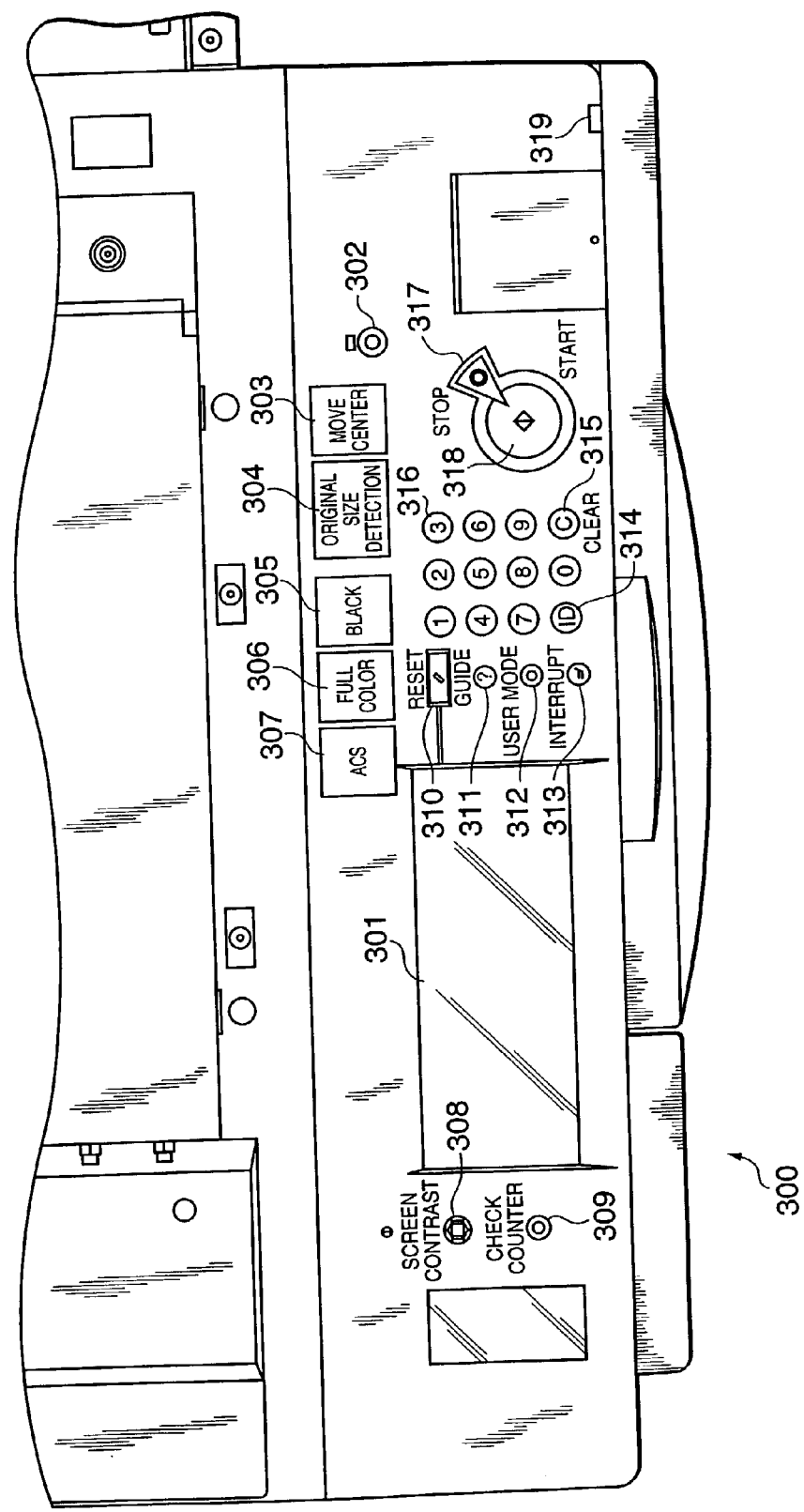
FIG. 3 is a plan view showing the construction of a first operation part of the image forming apparatus in FIG. 1.
Figure 4:
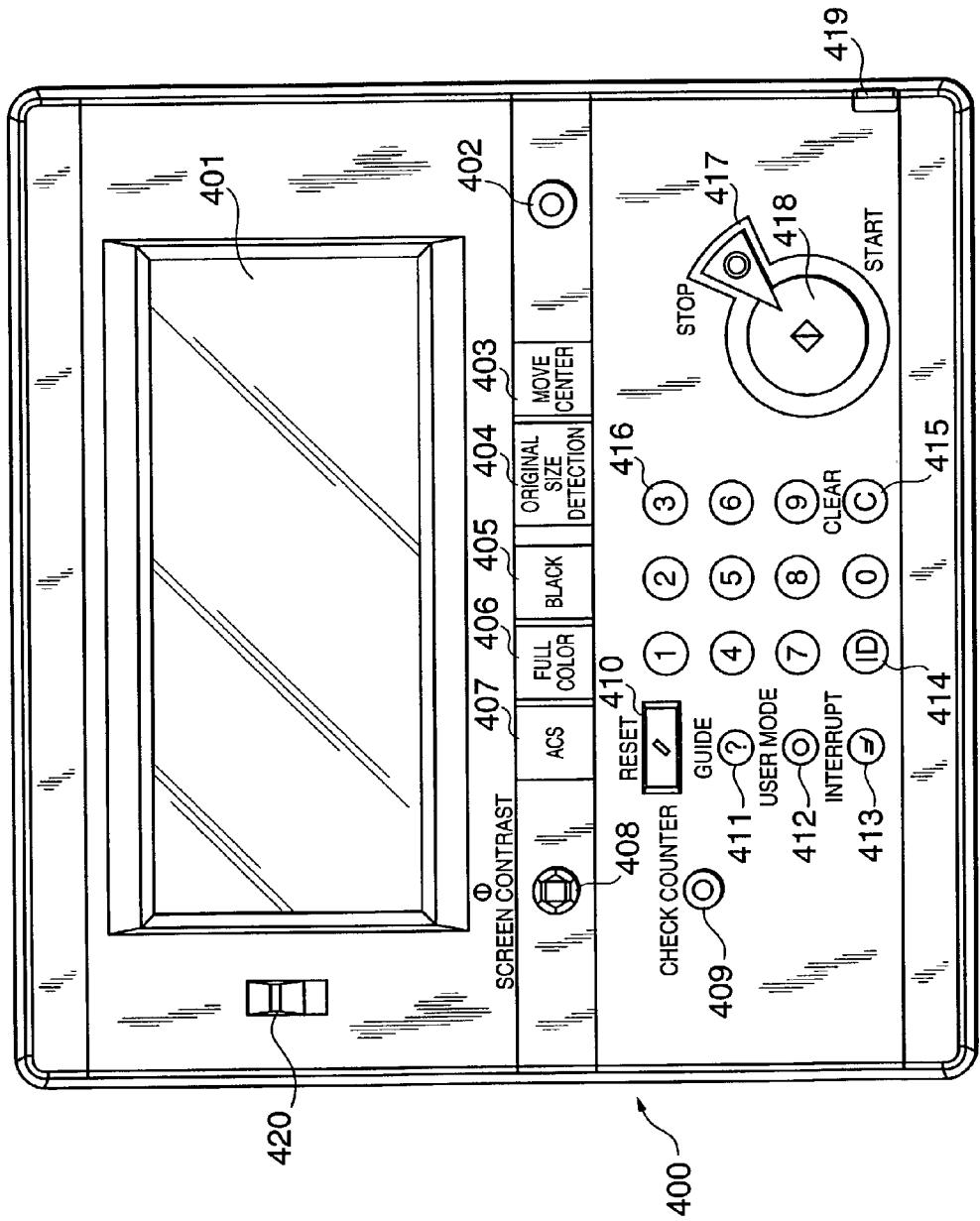
FIG. 4 is a plan view showing the construction of a second operation part of the image forming apparatus in FIG. 1.

FIG. 3 is a plan view of the construction of the first operation part 300 of the image forming apparatus in FIG. 1, while FIG. 4 is a plan view of the construction of the second operation part 400 of the image forming apparatus in FIG. 1. It should be noted that the first operation part 300 and the second operation part 400 are operation panels with basically the same construction, so that constructional elements that are common to both are designated by reference numerals with first and second lowest digits thereof being the same.

Reference numerals 301 and 401 designate LCD parts that display the state of the apparatus, settings for a copying job, etc. The LCD parts 301, 401 each have a touch panel attached over an LCD, so that by touching a selected region on a screen that is displayed on the LCD, the user can make detailed job settings, basic apparatus settings, etc.

Reference numerals 302 and 402 designate power-saving mode keys which are keys (key switches, with the same applying to the "keys" introduced hereafter) that are used when switching to and returning from power-saving mode. Power saving mode is a mode with reduced power consumption and is used when the user presses these key switches or when the apparatus has not been used for a predetermined time period. Methods for reducing the power consumption include a method of lowering the adjusted temperature of the fixing unit and a method of extinguishing the backlight of the LCDs. These power saving mode keys 302, 402 each have an internal LED (Light Emitting Diode), and by lighting the LEDs during power saving mode and extinguishing the LEDs during normal mode, the user can recognize whether power saving mode is currently set.

Reference numerals 303, 403 designate center moving keys for performing automatic control of the output timing of images so that the image being copied is formed on the center of the transfer sheet. These center moving keys 303, 403 also each have an internal LED which is lighted when the corresponding center moving key 303, 403 is set at ON.

Reference numerals 304, 404 designate original size detecting keys and when these original size detecting keys 304, 404 are set at ON, the image scanner part 100 scans the original 204 once at the start of a copying job so as to automatically detect the size of the original 204. These original size detecting keys 304, 404 also each have an internal LED which is lighted when the corresponding original size detecting key 304, 404 is set at ON.

Reference numerals 305, 405 designate black monochrome mode keys, and when these black monochrome mode keys 305, 405 are selected, image-forming operations are not performed for the colors M, C, and Y, so that an image forming operation is performed for BK (black) only. These black monochrome mode keys 305, 405 also each have an internal LED which is lighted when the corresponding black monochrome mode key 305, 405 is set at ON.

Reference numerals 306, 406 designate full color mode keys, and when these full color mode keys 306, 406 are selected, a full color image forming operation is performed for the colors M, C, Y and BK. These full color mode keys 306, 406 also each have an internal LED which is lighted when the corresponding full color mode key 306, 406 is set at ON.

Reference numerals 307, 407 designate ACS (auto color select) keys, and when these ACS keys 307, 407 are selected, the image scanner part 100 scans the original 204 once at the start of a copying job so as to read the color information of the original image, and automatically judges based on the read color information whether full color image formation or black monochrome image formation should be performed. These ACS keys 307, 407 also each have an internal LED which is lighted when the corresponding ASC key 307, 407 is set at ON.

Reference numerals 308, 408 designate screen contrast adjusting volume controls, and by rotating these screen contrast adjusting volume controls 308, 408, the user can adjust the contrast of the screens of the LCD parts 301, 401. Reference numerals 309, 409 designate counter confirmation keys, and when these counter confirmation keys 309, 409 are pressed, the number of copies made up to the present (the total operation count of the apparatus) is displayed on the LCD parts 301, 401.

Reference numerals 310, 410 designate reset keys, and by pressing these reset keys 310, 410, the user can clear (initialize) the job settings.

Reference numeral 311, 411 designate guide keys. When these guide keys 311, 411 are pressed, screens that inform users of how to operate the image forming apparatus are displayed on the LCD parts 301, 401, and by performing selection operations using the touch panels of the LCD parts 301, 401 in accordance with the guidance given by these screens, the user can know the operation for making desired settings, for example. These guide keys 311, 411 each have an internal LED which flashes when the corresponding guide key 311, 411 is set at ON.

Reference numerals 312, 412 designate user mode keys. When these user mode keys 312, 412 are pressed, screens for basic specification settings (such as the setting of the timer period for the switch to power saving mode) of the image forming apparatus are displayed on the LCD parts 301, 401, and by performing selection operations using the touch panels of the LCD parts 301, 401 in accordance with these screens, the user can make the desired settings of the basic specification. These user mode keys 312, 412 each have an internal LED which flashes when the corresponding user mode key 312, 412 is set at ON.

Reference numerals 313, 413 designate interrupt copy keys, and by pressing these interrupt copy keys 313, 413 during a job, the job that is currently being performed can be temporarily interrupted to allow an urgent job to be performed first. These interrupt copy keys 313, 413 also each have an internal LED which is lighted when the corresponding interrupt copy key 313, 413 is set at ON.

Reference numeral 314, 414 designate ID (identification) keys, which are used in the case where the number of copies is managed separately for each company department, for example, and an ID (identification number) for each department is set as part of the basic specification of the apparatus. When IDs have been set, an ID input waiting screen is displayed on each of the screens of the LCD parts 301, 401 and when a user inputs a valid ID and presses the corresponding ID key 314, 414, a screen that allows operations to be made is displayed.

Reference numerals 316, 416 designate numeric keys for the digits 0 to 9, which are mainly used for inputting numbers such as the number of copies to be made. Reference numerals 315, 415 designate clear keys, which are used when clearing the set number of copies of a job that has been set via the numeric keys 316, 416. Reference numerals 317, 417 designate stop keys, and by pressing the stop keys 317, 417, a user can stop a copying operation that is currently being performed.

Reference numerals 318, 418 designate start keys, and when the user presses these start keys 318, 418, a copying operation is started by the image scanner part 100 and the printer part 200. Two types (green and orange) of LED are provided inside these start keys 318, 418, and by lighting the green LED during a state where copy settings can be made and lighting the orange LED during a state where the copy settings cannot be made, such as when there is a sheet jam or when a job is currently being processed, the user is informed of the state of the apparatus.

Reference numerals 319, 419 designate pilot lamps that are controlled so as to be lighted when the power of the apparatus is turned on. Reference numeral 420 designates an operation part switch SW, which is provided on the second operation part 400 only. By making a selection operation using the operation part switch SW 420, the user can select which of the first operation part 300 and the second operation part 400 is to be used.

Figure 5:
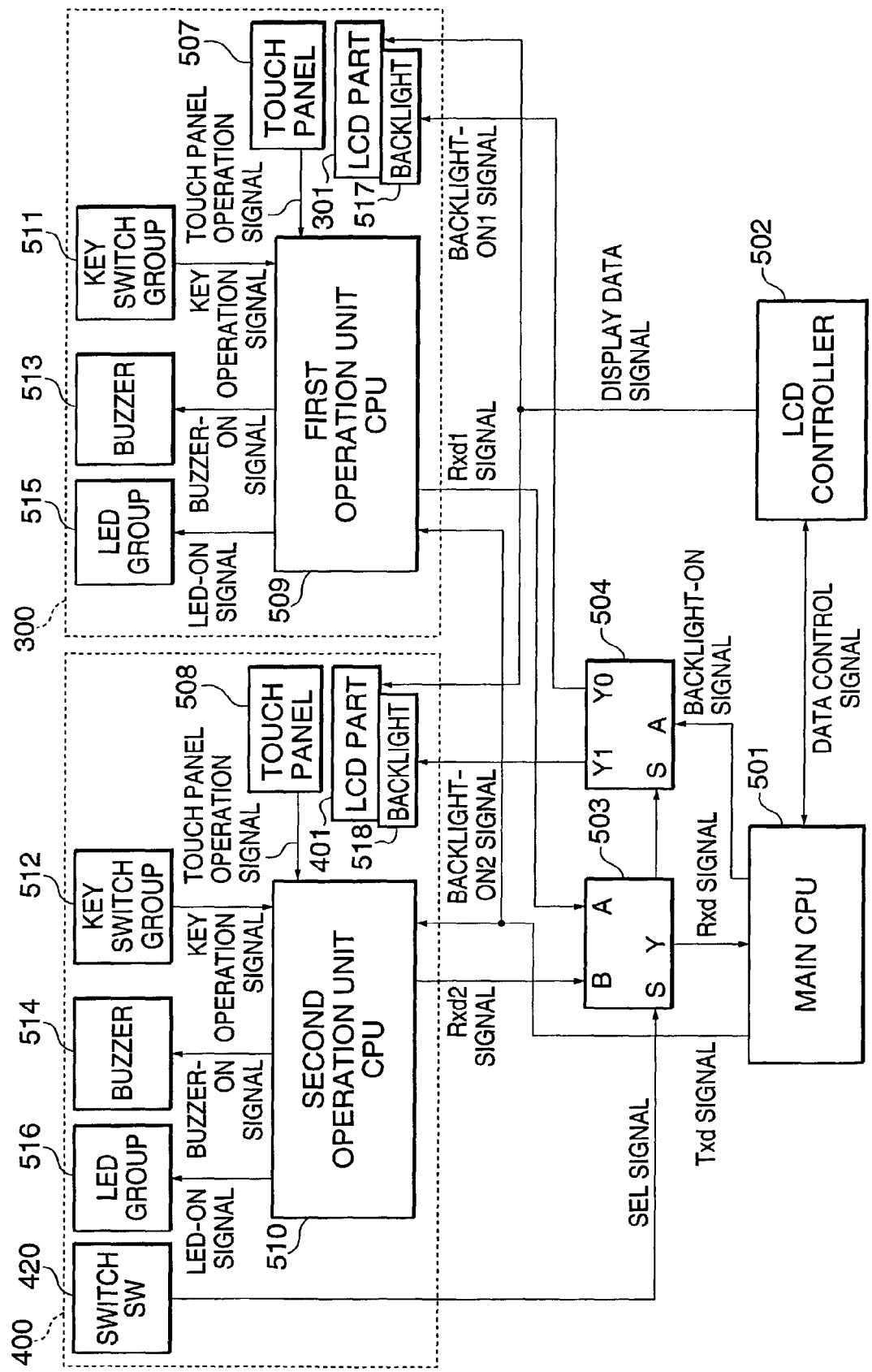
FIG. 5 is a block diagram showing the arrangement of an operation part switching control part that performs switching control of the first operation part and the second operation part.

FIG. 5 is a block diagram showing a switching control part for performing switching control between the first operation part and the second operation part.

In FIG. 5, the first operation part 300, the second operation part 400, the LCD part 301 of the first operation part 300 and the LCD part 401 of the second operation part 400 are the same as those that appear in FIGS. 3 and 4. The operation part switch SW 420 that is provided inside the second operation part 400 is also the same as the operation part switch SW 420 that appears in FIG. 4.

Reference numeral 501 designates a main CPU that controls the operation of the image forming apparatus, while reference numeral 502 designates an LCD controller that controls the displays of the LCD parts 301, 401.

Reference numeral 503 designates a selector that selects either a first operation part CPU 509 or a second operation part CPU 510 as the transmitter (recipient) of Rxd commands (Rxd signals) sent using serial communication, while reference numeral 504 designates a selector that selects either a first operation part backlight 517 or a second operation part backlight 518 as the recipient of a backlight ON signal for an LCD.

Reference numerals 507, 508 designate the touch panels of the first and second operation parts, respectively. Reference numerals 509, 510 designate CPUs for controlling the loads of the first and second operation parts, respectively. Reference numerals 511, 512 designate key SW groups (the numeric keypads and power saving mode keys, etc., that appear in FIGS. 3 and 4) of the first and second operation parts, respectively.

Reference numerals 513, 514 designate buzzers of the first and second operation parts, respectively, which are used to emit warning sounds and the like as necessary. Reference numerals 515, 516 designate LED groups (such as the LEDs that are provided inside power saving mode keys, the ACS keys 307, 407, etc., and the pilot lamps that appear in FIGS. 3 and 4) and reference numerals 517, 518 designate the backlights for the LCD parts of the first and second operation parts, respectively.

Figure 6:
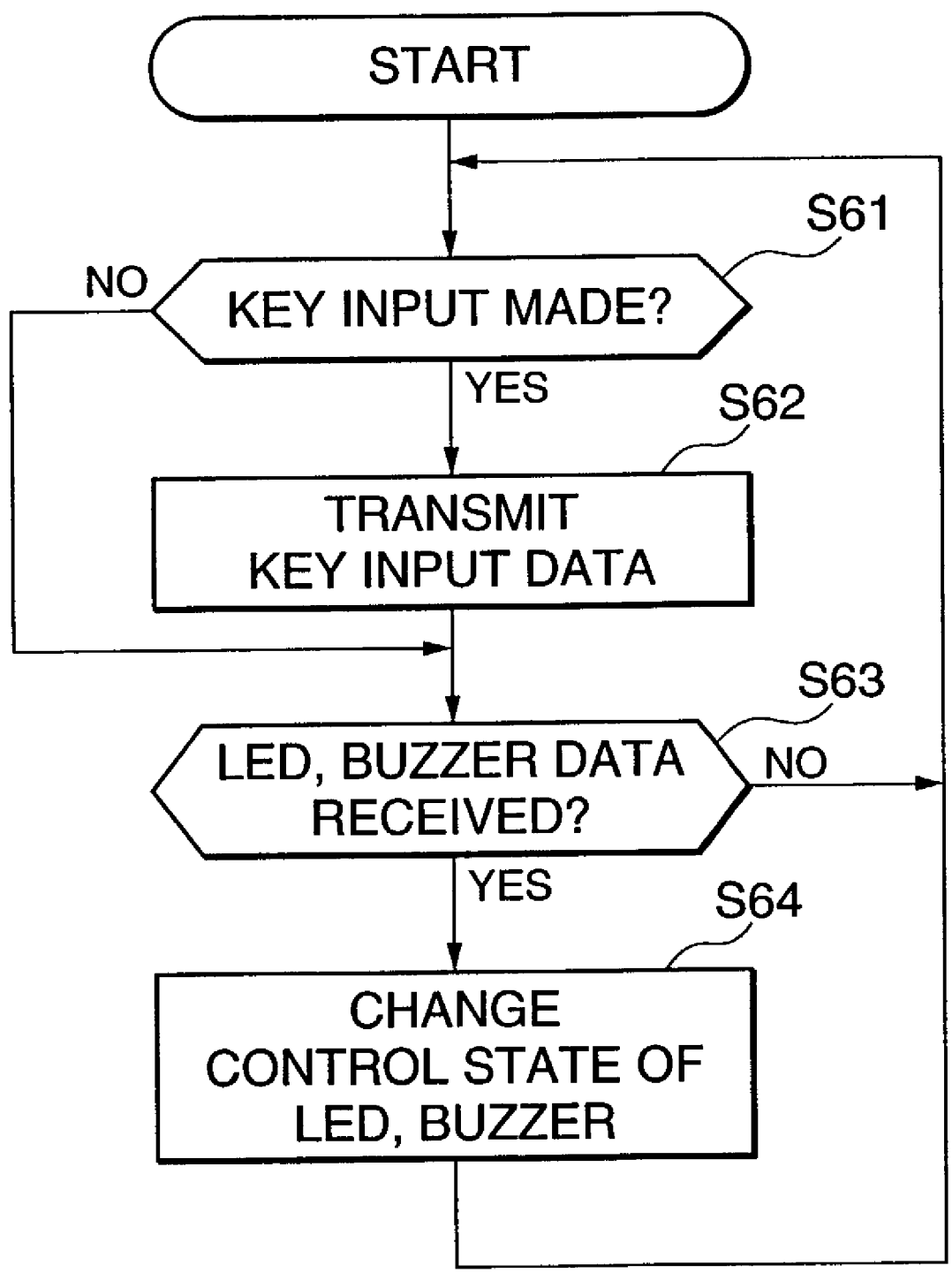
FIG. 6 is a flowchart showing the operation of an operation part CPU of the operation part switching control part appearing in FIG. 5.

Next, the control operations of the first operation part CPU 509 and the second operation part CPU 510 that appear in FIG. 5 will be described with reference to the flowchart that appears in FIG. 6. It should be noted that the control operations of the first operation part CPU 509 and the second operation part CPU 510 are almost the same, and therefore the operation of the first operation part CPU 509 only will be described here.

First, the first operation part CPU 509 determines whether a key operation signal from the key switch group 511 or a touch panel operation signal from the touch panel 507 has been inputted (step S61). When no operation signal has been inputted, the process proceeds to step S63 that will be described below.

On the other hand, when a key operation signal from the key switch group 511 or a touch panel operation signal from the touch panel 507 has been inputted, the inputted signal is encoded to produce serial data and the serial data is transmitted via the selector 503 to the main CPU 501 as an Rxd1 signal (key input data) (step S62), and then the process proceeds to step S63.

In step S63, the first operation part CPU 509 determines whether a serial command (data) of "LED-ON" or "buzzer-ON" has been received as a Txd signal from the main CPU 501. When one of the above serial commands has been received, the first operation part CPU 509 inverts the state (high or low) of an LED-ON signal or a buzzer-ON signal in accordance with the serial command (step S64) to thereby change the control state of the LED or the buzzer, and then the process returns to step S61 to repeat the processing in step S61 onwards.

Figure 7:
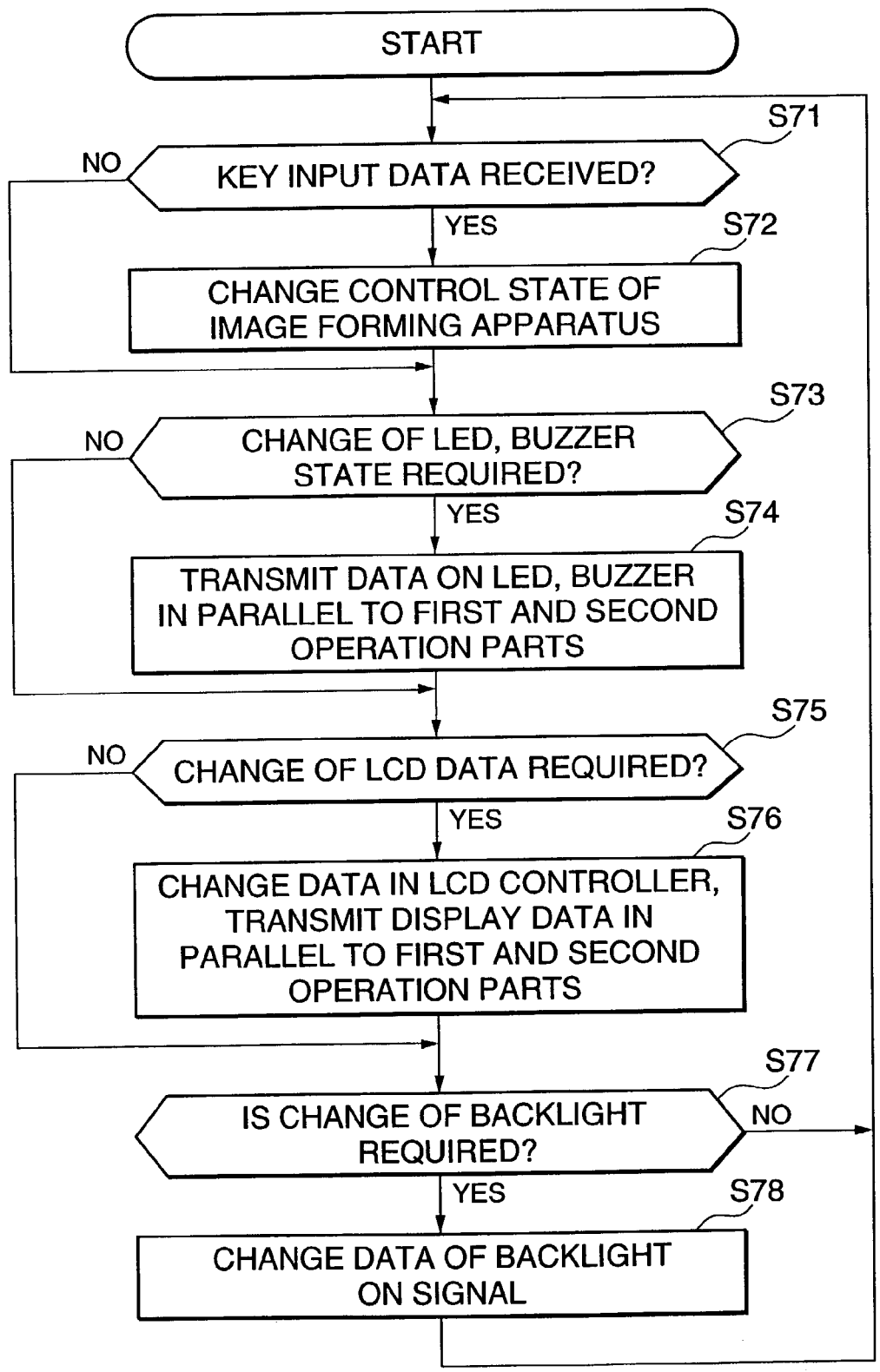
FIG. 7 is a flowchart showing the operation of a main CPU appearing in FIG. 5.

Next, the control operation of the main CPU 501 will be described with reference to the flowchart in FIG. 7.

The main CPU 501 determines whether key input data has been received as an Rxd signal from one of the first operation part CPU 509 and the second operation part CPU 510 (step S71).

When key input data has not been received, the process proceeds to step S73 that will be described below. On the other hand, when key input data has been received, the main CPU 501 changes the control state of the image forming apparatus and performs a process in accordance with this key input data, such as starting a copying operation or stopping a copying operation (step S72), followed by the process proceeding to step S73.

In step S73, it is determined whether it is necessary to change the ON state of the LED or the buzzer. When this is not necessary, the process proceeds to step S75 which will be described later. On the other hand, when it is necessary, data on the LED-ON state or the buzzer-ON state is encoded to produce serial data that is transmitted to the first operation part CPU 509 and the second operation part CPU 510 as the Txd signal (step S74).

Here, the change in the LED-ON state or Buzzer-ON state can be performed in two cases, a first case where the change is performed according to a key input, and a second case where the change is performed according to a change in the state of the apparatus (such as when there is a sheet jam or the apparatus switches to automatic power saving mode). The Txd signal is always supplied in parallel to the first operation part 300 and the second operation part 400, so that the LED groups 515, 516 and the buzzers 513, 514 of the first operation part 300 and the second operation part 400 are simultaneously controlled in accordance with LED-ON and Buzzer-ON information from the main CPU 501.

Next, the main CPU 501 determines whether it is necessary to change LCD data that is displayed on the LCDs (step S75), and when it is unnecessary, the process proceeds to step S77 which will be described later. When it is necessary, the main CPU 501 changes the LCD data for the LCD controller 502 (step S76).

In the present case, the LCD data is always transmitted in parallel from the LCD controller 502 to the first operation part 300 and the second operation part 400 as the display data signal, so that the main CPU 501 always controls the LCD parts 301, 401 of the first operation part 300 and the second operation part 400 simultaneously in accordance with the LCD data set in the LCD controller 502.

Next, the main CPU 501 determines whether it is necessary to change the lighting states of the backlights (step S77), and when it is not necessary, the process returns to step S71 to repeat the same processing. On the other hand, when it is necessary, the main CPU 501 changes the backlight ON signal (step S78), and then the process returns to step S71 to repeat the same processing.

Here also, the change in the LCD data or the change in the lighting state of the backlights can be performed in two cases, a first case where the change is performed according to a key input, and a second case where the change is performed according to a change in the state of the apparatus (such as when there is a sheet jam or the apparatus switches to automatic power saving mode).

Figure 8:
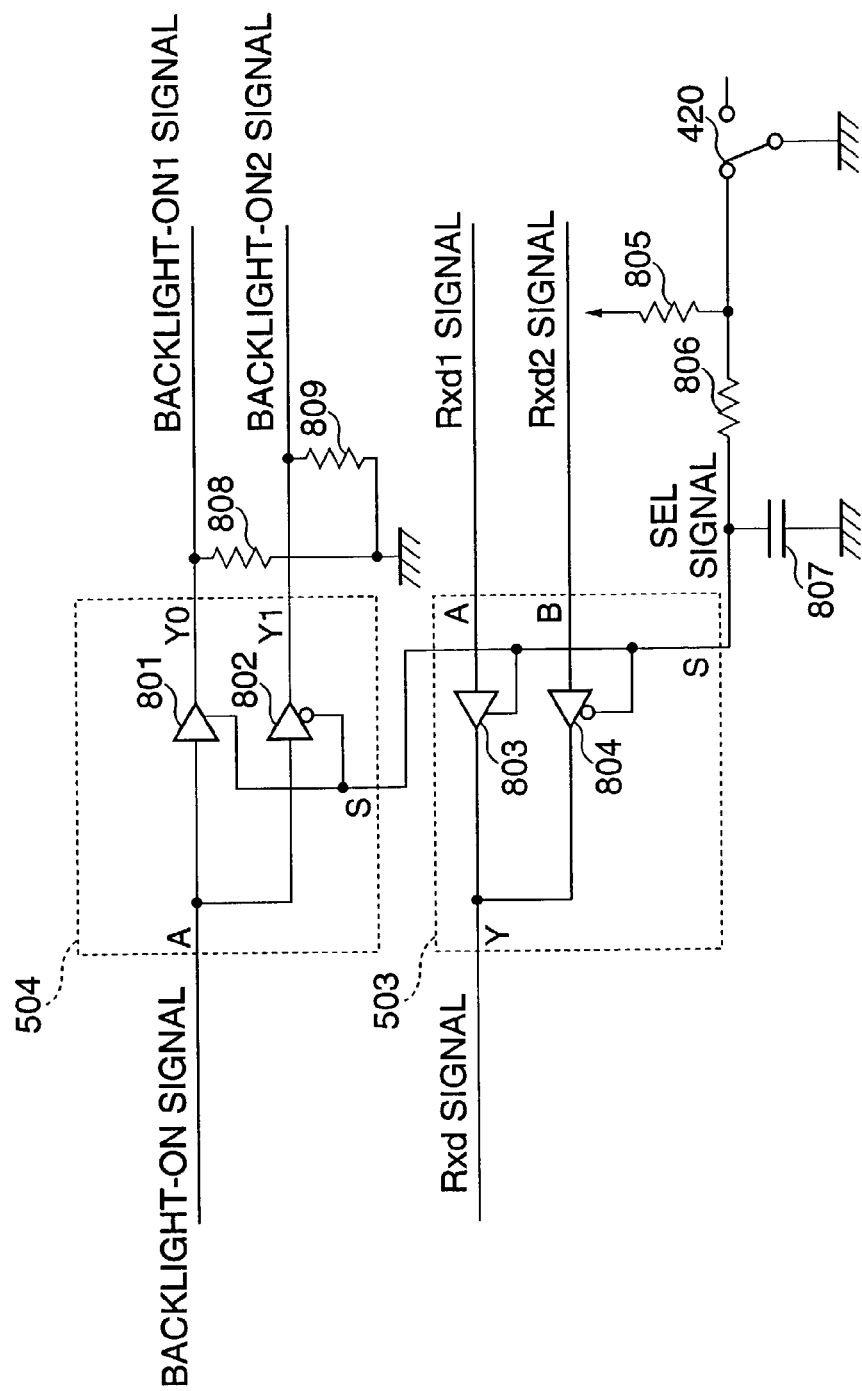
FIG. 8 is a circuit diagram showing the circuit configurations of selectors of the operation part switching control part in FIG. 5.

FIG. 8 is a circuit diagram showing the constructions of the switching circuits, that is, the selectors 503, 504 appearing in FIG. 5, in detail.

The selector 503 selects signals that are inputted to terminals A, B in FIG. 8 in accordance with a switching signal (SEL signal) from the operation part switch SW 420 that is disposed on the second operation part 400, and outputs the selected signal through a terminal Y.

The selector 504 outputs the signal inputted to the terminal A to one of a terminal Y0 and a terminal Y1 in accordance with the switching signal (SEL signal) from the operation part switch SW 420 that is disposed on the second operation part 400.

The selector 503 switches the input path of the Rxd signal between the first operation part 300 side (the Rxd1 signal) and the second operation part 400 side (the Rxd2 signal). The selector 504 switches the output path of the backlight ON signal between the first operation part 300 (the backlight ON1 signal) and the second operation part 400 (the backlight ON2 signal).

As shown in FIG. 8, the operation part switch SW 420 switches the switching signal (SEL signal) line between a state where the switching signal (SEL signal) line is connected to ground and a state where it is in an open state.

The SEL signal line is connected to a pull-up resistor 805 that has potential pulled up to a power supply voltage, so that the SEL signal is set at "L" when the operation part switch SW 420 is connected to ground and at "H" when the operation part switch SW 420 is in the open state. A resistor 806 and a capacitor 807 cooperate to form a low pass filter, which removes any chattering that is generated when the operation part switch SW 420 switches.

The selector 504 is comprised of a buffer 801, and a buffer 802. The buffers 801 and 802 have enable terminals, with the buffer 801 being output enabled when the enable terminal is at "H" and output disenabled (Hiz) when the enable terminal is at "L" and the buffer 802 being output enabled when the enable terminal is at "L" and output disenabled (Hiz) when the enable terminal is at "H". These enable terminals are both connected to a terminal S of the selector 504, with the terminal S also being connected to the SEL signal line from the operation part switch SW 420.

Reference numerals 808, 809 designate pull-down resistors that pull down the backlight ON1 signal and the backlight ON2 signal, respectively. As a result, the buffer

801 or 802 is disenabled, so that when the output is in the Hiz state, the output signal level can be fixed at "L".

The selector 503 is constructed in the same way as the selector 504. Specifically, the selector 503 is comprised of a buffer 803, and a buffer 804. The buffers 803 and 804 have enable terminals, with the buffer 803 being output enabled when the enable terminal is at "H" and output disenabled (Hiz) when the enable terminal is at "L" and the buffer 804 being output enabled when the enable terminal is at "L" and output disenabled (Hiz) when the enable terminal is at "H". These enable terminals are both connected to a terminal S of the selector 503, with the terminal S also being connected to the SEL signal line from the operation part switch SW 420.

Next, a description will be given of the operation of the selector 503. As shown in FIG. 8, input terminals of the buffers 803, 804 are connected respectively to the input terminals A, B of the selector 503, with the input terminal A being connected to the Rxd1 signal line from the first operation part CPU 509 and the terminal B being connected to the Rxd2 signal line from the second operation part CPU 510. Output terminals of the buffers 803, 804 are both connected to the terminal Y of the selector 503, with the terminal Y being connected to the Rxd signal line to the main CPU 501.

Figure 9:
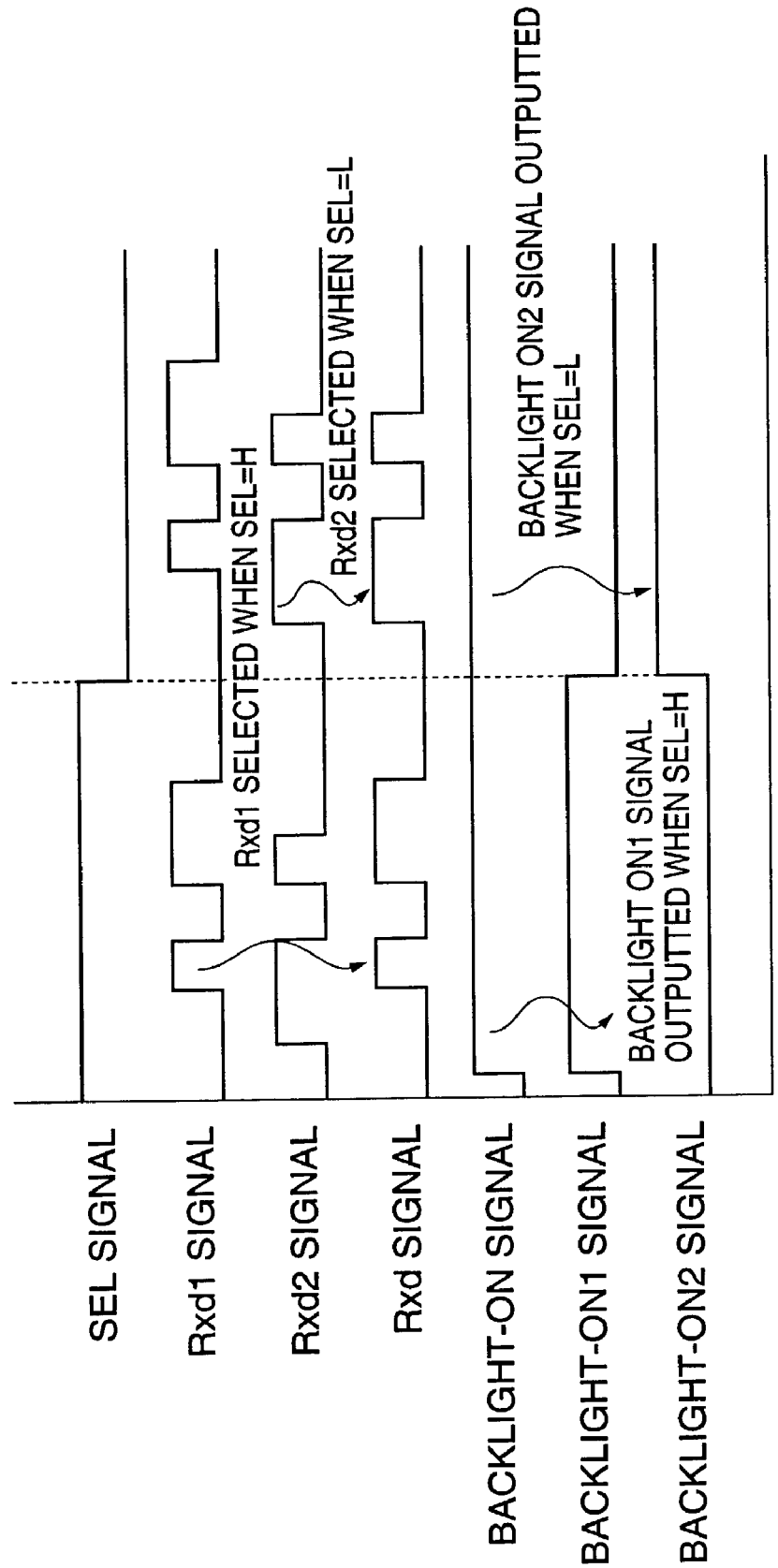
FIG. 9 is a timing chart showing a switching operation by the selector in FIG. 8.

With this arrangement, when the SEL signal is at "H", the buffer 803 is enabled, and the buffer 804 is disenabled, so that as shown in FIG. 9, the Rxd1 signal from the first operation part CPU 509 is outputted to the Rxd signal line while the Rxd2 signal from the second operation part CPU 510 is not outputted. Accordingly, the output of the Rxd2 signal to the main CPU 501 as the Rxd signal is invalidated so that only the output of the Rxd1 signal is validated. On the other hand, when the SEL signal is at "L", the output of the Rxd1 signal to the main CPU 501 as the Rxd signal is invalidated so that only the output of the Rxd2 signal is validated (see FIG. 9).

In other words, when the operation part switch SW 420 is turned ON and the SEL signal has become "H", the main CPU 501 is informed of the Rxd1 signal that shows the key operations and touch panel operations of the first operation part 300, so that such operations of the first operation part 300 are permitted, while the main CPU 501 is not informed of the Rxd2 signal that shows the key operations and touch panel operations of the second operation part 400, so that such operations of the second operation part 400 are prohibited.

On the other hand, when the operation part switch SW 420 is turned OFF and the SEL signal has become "L", the main CPU 501 is informed of the Rxd2 signal that shows the key operations and touch panel operations of the second operation part 400, so that such operations of the second operation part 400 are permitted, while the main CPU 501 is not informed of the Rxd1 signal that shows the key operations and touch panel operations of the first operation part 300, so that such operations of the first operation part 300 are prohibited.

Next, a description will be given of the operation of the selector 504. As shown in FIG. 8, input terminals of the buffers 801, 802 are connected to the input terminal A of the selector 504, with the input terminal A also being connected to the backlight ON signal line of the main CPU 501.

An output terminal of the buffer 801 is connected to the terminal Y0 of the selector 504, with the terminal Y0 also being connected to the backlight ON1 signal line to the first operation part CPU 509. An output terminal of the buffer 802 is connected to the terminal Y1 of the selector 504, with the terminal Y1 also being connected to the backlight ON2 signal line to the second operation part CPU 510.

With this arrangement, when the SEL signal is at "H", the buffer 801 is enabled, and the buffer 802 is disenabled, so that as shown in FIG. 9, the backlight ON signal is outputted to the backlight ON1 signal line, with the backlight ON2 signal being fixed at "L".

In the present embodiment, a backlight is lighted when the backlight ON signal is at "H", so that if the SEL signal is at "H" and the first operation part 300 is selected, when the backlight ON signal is at "H", the backlight 517 of the selected first operation part 300 is lighted and the backlight 518 of the unselected second operation part 400 is extinguished.

On the other hand, if the SEL signal is at "L" and the second operation part 400 is selected, when the backlight ON signal is at "H", the backlight 518 of the selected second operation part 400 is lighted and the backlight 517 of the unselected first operation part 300 is extinguished.

In this way, by switching the operation part switch SW 420, as shown by the timing chart in FIG. 9, when the SEL signal is at "H", the Rxd1 signal from the first operation part 300 is outputted to the main CPU 501 as the Rxd signal and the backlight ON signal from the main CPU 501 is outputted only as the backlight ON1 signal of the first operation part 300, so that key operations, touch panel operations, and backlight control for the first operation part 300 are validated, while key operations, touch panel operations, and backlight control for the second operation part 400 are invalidated.

On the other hand, when the SEL signal is at "L", the Rxd2 signal from the second operation part 400 is outputted to the main CPU 501 as the Rxd signal and the backlight ON signal from the main CPU 501 is outputted only as the backlight ON2 signal of the second operation part 400, so that key operations, touch panel operations, and backlight control for the second operation part 400 are validated, while key operations, touch panel operations, and backlight control for the first operation part 300 are invalidated.

It should be noted that when the second operation part 400 has been removed, the operation part switch SW 420 is opened (set at ON), so that the SEL signal is pulled up and set at "H" by the resistor 805, resulting in the first operation part 300 being selected and validated.

In this way, by switching the operation part switch SW 420 as described above, key operations, touch panel operations and backlight control are invalidated for the operation part that is not selected.

It should be noted that in this way, while where there is a key operation of the key switch group of the operation part that is not selected, the key operation is invalidated, when there is a key operation of the key switch group of the operation part that is selected, the key operation is validated. As a result, since the LED lighting signal (Txd signal) is transmitted to both the operation parts, not only the LEDs corresponding to the selected operation part but also the LEDs corresponding to the unselected operation part are driven. However, as described earlier, the backlight of only the selected operation part is lighted. The display data for the LCD parts 301, 401, meanwhile, is always transmitted to both of the LCD parts 301, 401 by the LCD controller 502 regardless of the selection state of the operation parts.

Accordingly, regardless the timing in which the operation part switch SW 420 is switched, the same screen and LED lighting state can be maintained without having to retransmit the display data and LED lighting signal, so that even if the operation part switch SW 420 is switched, the result of the operation made using one operation part can be verified by the user via the other operation part. Also, even if the operation part switch SW 420 is switched, an operation that is partly made using one operation part can be continued using the other operation part.

The above construction is used because power consumption can be sufficiently reduced simply by controlling the backlights that have high power consumption, and moreover because it is believed that convenience is more important to a larger number of users.

Second Embodiment

Although in the first embodiment described above, control is performed by providing a CPU in each of the first operation part 300 and the second operation part 400 and performing transmission and reception with the main CPU 501, it is possible to eliminate the CPUs in the operation parts by having the loads of the first and second operation parts 300, 400 controlled directly by the main CPU 501.

Figure 10:
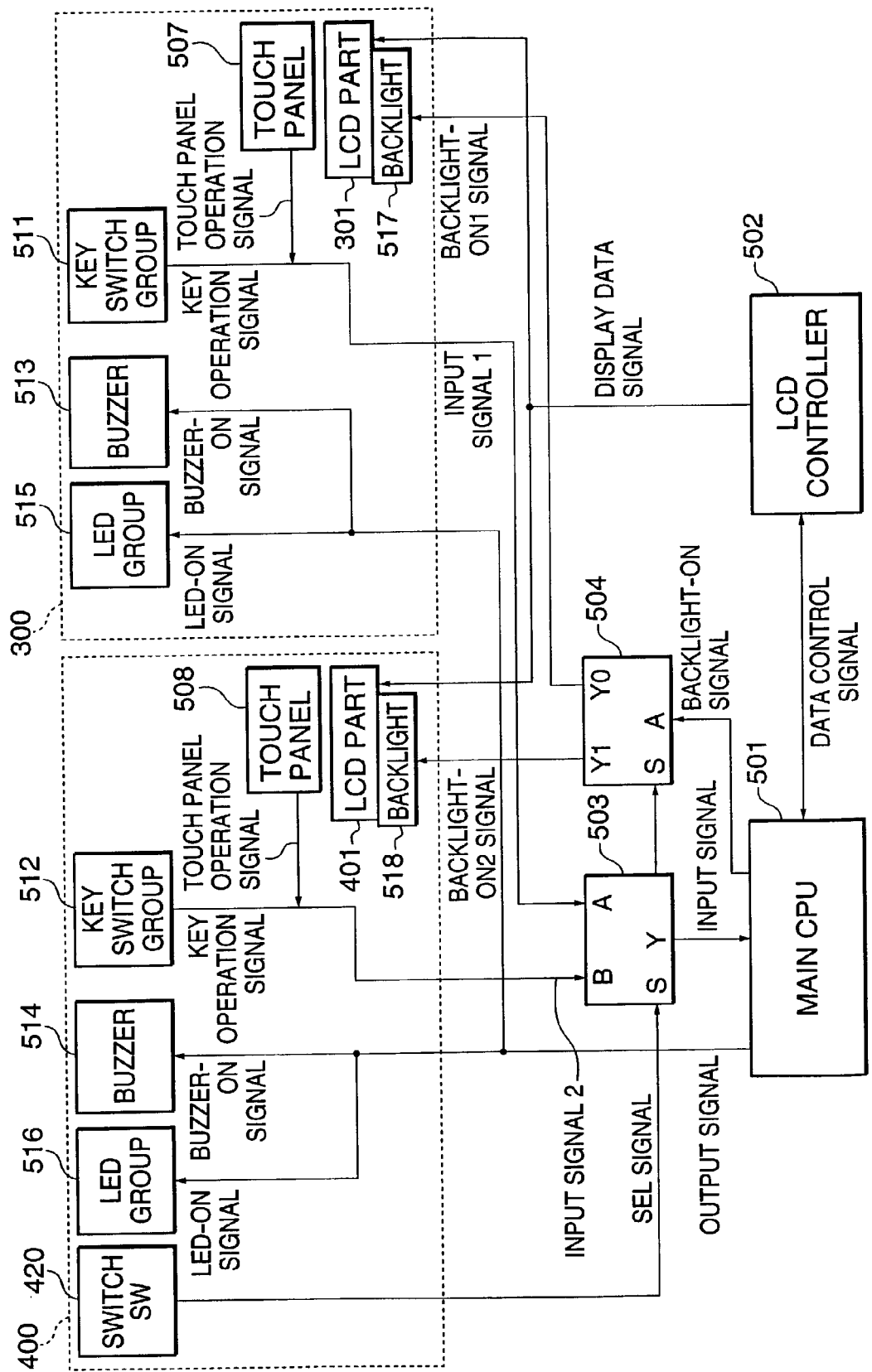
FIG. 10 is a block diagram showing the arrangement of an operation part switching control part of an image forming apparatus according to a second embodiment of the present invention.

FIG. 10 is a block diagram showing the arrangement of an operation part switching control part of an image forming apparatus according to a second embodiment of the present invention.

In FIG. 10, the main CPU 501 has separate input and output ports corresponding to the loads provided in the operation parts. It should be noted that in FIG. 10, the input/output ports corresponding to these loads have been omitted.

Also, signal lines of input signals 1, 2, an input signal line, and an output signal line that are shown in FIG. 10 are composed of a bus, with the input signals 1, 2, the input signal, and the output signal being inputted and outputted as parallel signals.

The control of the backlights 517, 518 of the operation parts 300, 400 is performed directly by the main CPU 501 in the same way as in the first embodiment described above. The display data for the LCD parts 301, 401 is always transmitted to both the operation parts by the LCD controller 502 regardless of the selection states of the operation parts, in the same way as in the first embodiment described above.

An output signal from the main CPU 501 is sent to the loads, i.e., the LED groups 515, 516 and the buzzers 513, 514, in both the first operation part 300 and the second operation part 400, so that for example, when the main CPU 501 turns ON the LEDs of the ACS keys 307, 407 of the operation parts, the output ports corresponding to the LEDs of the ACS keys are set at ON so that the LEDs of the ACS keys 307, 407 of the first operation part 300 and the second operation part 400 are simultaneously lighted.

In accordance with the SEL signal from the operation part switch SW 420, the selector 503 switches an input signal to the main CPU 501 to the input signal 1 line or the input signal 2 line, so that one of parallel signals sent from the loads, i.e., the key switch groups 512, 511, and the touch panels 507, 508 in the first operation part 300 and the second operation part 400, is selected and inputted to the corresponding input port of the main CPU 501.

With this arrangement, the main CPU 501 can obtain a key input or touch panel input from the selected operation part only as a port input, while the port output is always outputted to both the first operation part 300 and the second operation part 400, so that even if CPUs are not provided in the first operation part 300 and the second operation part 400, the same effects as those obtained by the first embodiment described earlier can be obtained.

Third Embodiment

In the first and second embodiments, the process for switching between operation parts is performed by hardware, but in this third embodiment, the process is achieved by software.

Figure 11:
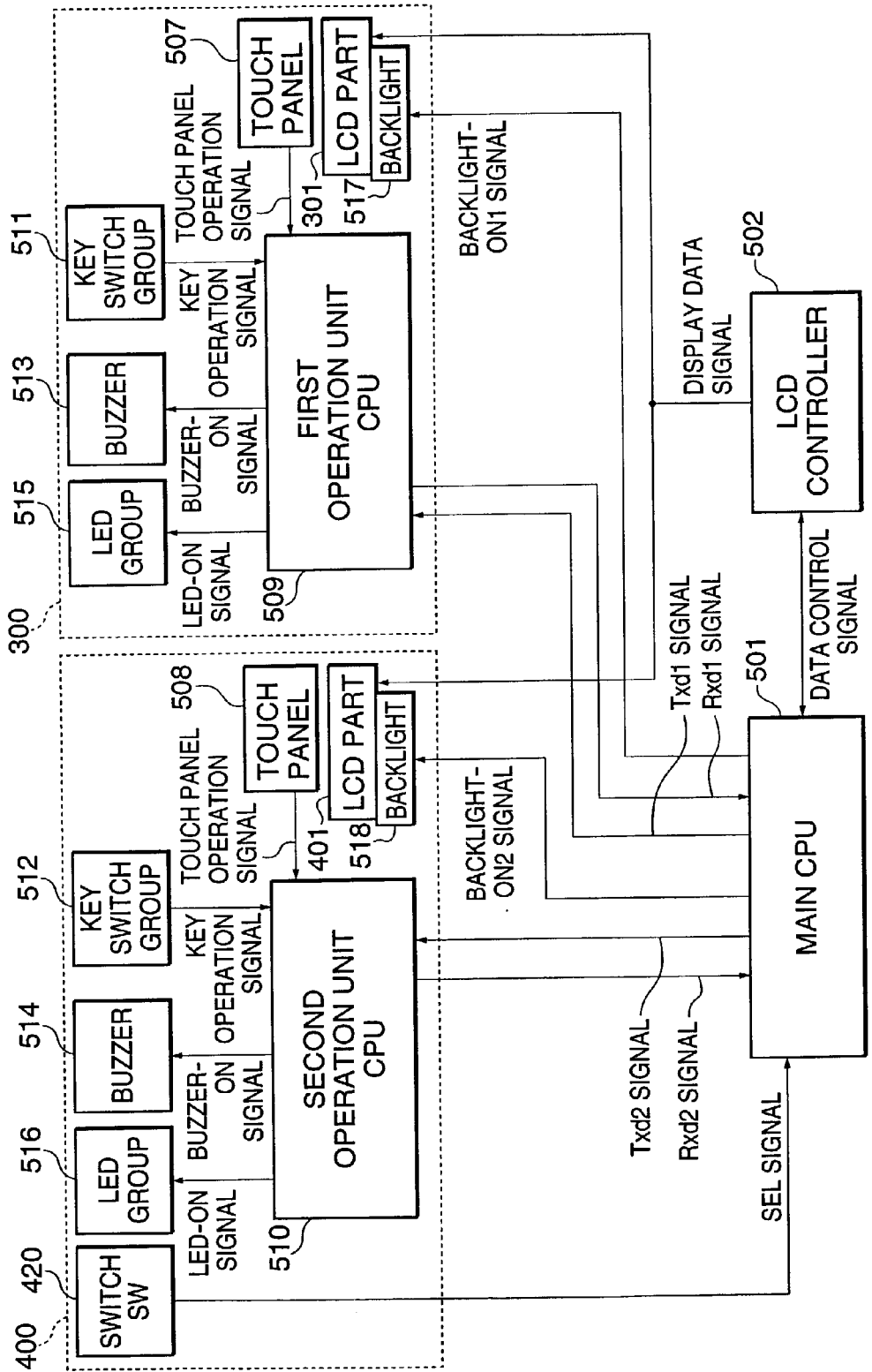
FIG. 11 is a block diagram showing the arrangement of an operation part switching control part of an image forming apparatus according to a third embodiment of the present invention.

FIG. 11 is a block diagram showing the arrangement of an operation part switching control part of an image forming apparatus according to the third embodiment of the present invention.

In FIG. 11, the main CPU 501 has two output ports for the Txd signal and two input ports for the Rxd signal so that the main CPU 501 can communicate with the first operation part CPU 509 and the second operation part CPU 510 independently of one another. The main CPU 501 also has two output ports for the backlight ON signal.

The SEL signal from the operation part switch SW 420 is directly inputted to an input port of the main CPU 501.

Figure 12:
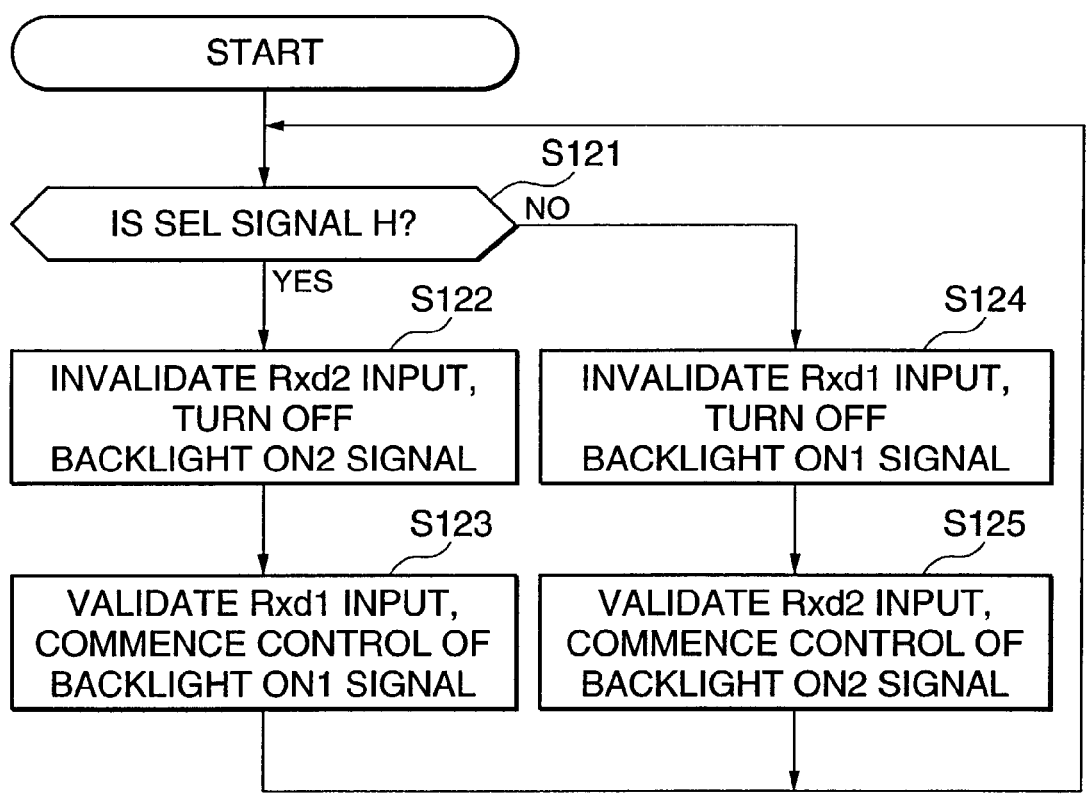
FIG. 12 is a flowchart showing the operation of a main CPU of the operation part switching control part appearing in FIG. 11.

In the flowchart in FIG. 12, the main CPU 501 first determines whether the inputted SEL signal is at "H" (step S121). When the SEL signal is at "H", the main CPU 501 recognizes that the first operation part 300 is selected, invalidates the Rxd2 signal from the second operation part 400, and turns OFF the backlight ON2 signal for the second operation part 400, thereby prohibiting key operations and touch panel operations of the second operation part 400 and extinguishing the backlight 518 (step S122).

After this, the main CPU 501 validates the input of the Rxd1 signal from the first operation part 300, and commences the control of the backlight ON1 signal, thereby permitting key operations and touch panel operations of the first operation part 300 and performing control that the backlight 517 is lighted (step S123), followed by the process returning to step S121.

On the other hand, when the SEL signal is at "L", the main CPU 501 recognizes that the second operation part 400 is selected, invalidates the Rxd1 signal from the first operation part 300, and turns OFF the backlight ON1 signal for the first operation part 300, thereby prohibiting key operations and touch panel operations of the first operation part 300 and extinguishing the backlight 517 (step S124).

After this, the main CPU 501 validates the input of the Rxd2 signal from the second operation part 400, and commences the control of the backlight ON2 signal, thereby permitting key operations and touch panel operations of the second operation part 400 and performing control that the backlight 518 is lighted (step S125), followed by the process returning to step S121.

In this way, the process for switching the operation part can be performed by software.

It should be noted that in the present embodiment, the output process for the Txd1 signal, Txd2 signal for lighting LEDs may output the Txd1 signal or Txd2 signal to both the operation parts regardless of which operation part is selected in the same way as in the first embodiment described above, or alternatively may output the Txd1 signal or the Txd2 signal to only the operation part that has been selected.

When the Txd1 signal or Txd2 signal is outputted in this way to only the selected operation part, only the LEDs of the selected operation part are lighted and the LEDs of the unselected operation part are not lighted, so that a further reduction can be made in power consumption.

As described above, according to the above embodiments, one of two operation parts is selected using a switch SW and key inputs are prohibited for the unselected operation part, thereby making it possible to prevent the user from making unintended erroneous operations. By turning off the backlight of the unselected operation part, a reduction can be made in power consumption.

By transmitting data, such as ON data for LEDs provided in keys and LCD display data, to both the operation parts regardless of which operation part is selected, the results of an operation made via one operation part can be confirmed via the other operation part and an operation that is partly made using one operation part can be continued using the other operation part no matter when the selection of operation part is switched.

Also, when one of the operation parts has been removed, the remaining operation part is automatically selected, so that an operation part can be easily attached and detached for users who require two operation parts and users who do not.

It should be noted that the present invention is not limited to the above described embodiments, but by using a tri-state switch, for example, it is possible not only to validate the operations of one of the first operation part 300 and the second operation part 400, but also to validate operations of both the operation parts as in the conventional apparatus.

The present invention may be applied to cases where CRT (Cathode Ray Tube) displays are used in the operation parts in place of the LCD parts and backlights that have been described above. In this case, instead of lighting and extinguishing the backlights, the power supply to the CRT display apparatuses may be turned ON and OFF. The present invention may also be applied to an image forming apparatus that has three or more operation parts.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the embodiment described above, and hence the storage medium on which the program code is stored constitutes the present invention.

Examples of the storage medium for supplying the program code include a floppy (registered trademark) disk, a hard disk, an optical disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into an expansion board inserted into a computer or a memory provided in an expansion unit connected to the computer and then causing a CPU or the like provided in the expansion board or the expansion unit to perform a part or all of the actual operations based on instructions of the program code.

What is claimed is:
1. An image forming apparatus comprising:
a plurality of operation parts;
a selection device that selects at least one operation part out of said plurality of operation parts; and a controller that invalidates operation by at least one operation part that is not selected by said selection device, out of said plurality of operation parts,
wherein said plurality of operation parts each have an input device including electric luminescence parts, and a liquid crystal display part having a backlight, and
wherein said controller outputs same display data for all the liquid crystal display parts of said plurality of operation parts regardless of the selection by said selection device, invalidates operation by said input device of each of said at least one operation part that is not selected by said selection device, out of the plurality of operation parts, prohibits lighting of the backlight of each of said at least one operation part that is not selected by said selection device, permits operation by said input device of each of said at least one operation part that is selected by said selection device, lights the backlight of each of said at least one operation part that is selected by said selection device, and lights said electric luminescence parts of said input device of each of said at least one operation part that is selected by said selection device.

2. An image forming apparatus comprising:
a plurality of operation parts;
a selection device that selects at least one operation part out of said plurality of operation parts; and
a controller that invalidates operation by at least one operation part that is not selected by said selection device, out of said plurality of operation parts,
wherein said plurality of operation parts each have an input device including electric luminescence parts, and a liquid crystal touch panel having a backlight, and
wherein said controller outputs same display data for all the liquid crystal display parts of said plurality of operation parts regardless of the selection by said selection device, invalidates operation by said input device and input from the liquid crystal touch panel of each of said at least one operation part that is not selected by said selection device, out of the plurality of operation parts, prohibits lighting of the backlight of each of said at least one operation part that is not selected by said selection device, permits operation by said input device and input from the liquid crystal touch panel of each of said at least one operation part that is selected by said selection device, lights the backlight of each of said at least one operation part that is selected by said selection device, and lights said electric luminescence parts of said input device of each of said at least one operation part that is selected by said selection device.

3. A method of controlling an image forming apparatus including a plurality of operation parts, the plurality of operation parts each having an input device including electric luminescence parts and a liquid crystal display part having a backlight, the method comprising:
a selecting step of selecting at least one operation part out of the plurality of operation parts;
an output step of outputting same display data for all the liquid crystal display parts of the plurality of operation parts regardless of the selection in said selecting step;
an invalidating step of invalidating operation by said input device of each of said at least one operation part that is not selected in said selecting step, out of the plurality of operation parts;

a prohibiting step of prohibiting lighting of the backlight of each of said at least one operation part that is not selected in said selecting step;

a permission step of permitting operation by said input device of each of said at least one operation part that is selected in said selecting step;

a backlight lighting step of lighting the backlight of each of said at least one operation part that is selected in said selecting step; and a lighting step of lighting said electric luminescence parts of said input device of each of said at least one operation part that is selected in said selecting step.

4. A method of controlling an image forming apparatus including a plurality of operation parts, the plurality of operation parts each having an input device including electric luminescence parts and a liquid crystal touch panel having a backlight, the method comprising:

a selecting step of selecting at least one operation part out of the plurality of operation parts;

an output step of outputting same display data for all the liquid crystal touch panels of the plurality of operation parts regardless of the selection in said selecting step;

an invalidating step of invalidating operation by said input device and input from the liquid crystal touch panel of each of said at least one operation part that is not selected in said selecting step, out of the plurality of operation parts;

a prohibiting step prohibiting lighting of the backlight of each of said at least one operation part that is not selected in said selecting step;

a permission step of permitting operation by said input device and input from the liquid crystal touch panel of each of said at least one operation part that is selected in said selecting step;

a backlight lighting step of lighting the backlight of each of said at least one operation part that is selected in said selecting step; and a lighting step of lighting said electric luminescence parts of said input device of each of said at least one operation part that is selected in said selecting step.

* * * * *